United States Patent [19]

Ukai et al.

[11] Patent Number: 4,476,670
[45] Date of Patent: Oct. 16, 1984

[54] SPEED-SLOWING CONVEYING TOOL FOR FRUITS AND THE LIKE

[75] Inventors: Nobuo Ukai, Yanagawa; Nagahiro Kawano; Yasumasa Toyofuku, both of Kurume; Akira Nakamura, Ookawa, all of Japan

[73] Assignee: Tsukihoshi Kasei Kabushiki Kaisha, Kurume, Japan

[21] Appl. No.: 502,935

[22] Filed: Jun. 10, 1983

[30] Foreign Application Priority Data

Dec. 28, 1982 [JP] Japan ................................. 57-234196

[51] Int. Cl.³ ............................................. A01G 19/08
[52] U.S. Cl. .................................... 56/328 R; 56/329; 193/7; 193/25 R; 193/32
[58] Field of Search ................. 56/328 R, 329 R, 332, 56/334, 336, 340; 193/7, 15, 32, 25 R, 25 E, 25 C, 25 S

[56] References Cited

U.S. PATENT DOCUMENTS

| | | | |
|---|---|---|---|
| 1,309,119 | 7/1919 | Dillon | 193/7 |
| 1,680,925 | 8/1928 | Wood | 193/7 |
| 3,464,529 | 9/1969 | Horsky, Jr. | 193/32 |
| 3,489,258 | 1/1970 | Stokes | 193/32 |
| 3,565,225 | 2/1971 | Fay | 193/7 |
| 3,664,104 | 5/1972 | Jamshidi | 56/332 |

Primary Examiner—Gene Mancene
Assistant Examiner—David I. Tarnoff
Attorney, Agent, or Firm—Stevens, Davis, Miller & Mosher

[57] ABSTRACT

A conveying tool comprises a funnel-shaped hopper and a tubular conveying part connected to the bottom of and hanging downward from the hopper, the conveying part comprising one unit section or a plurality of unit sections detachably connected end-to-end, each unit section comprising a pair of opposed and spaced-apart, rectangular main sheets and a pair of opposed rectangular side sheets with vertical edges secured to respective vertical edges of the main sheets thereby to form a tubular structure. The main sheets possess elasticity and flexibility and have, on the inner surfaces thereof, a large number of elastic projecting members, and the side sheets possess flexibility and are more pliable than the main sheets. Picked fruit dropped into the hopper are braked in their descent by the elastic projecting members and the inner wall surface of the conveying part and are thereby slowly lowered without damage to a container on the ground or on a vehicle.

7 Claims, 10 Drawing Figures

FIG. 1a
FIG. 1b
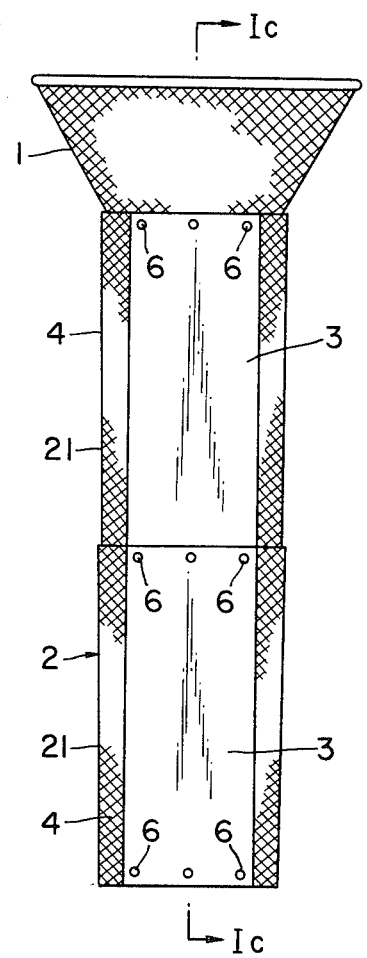
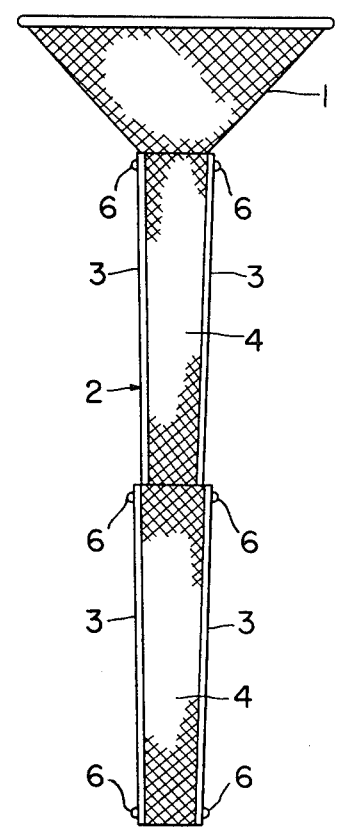

FIG. 3
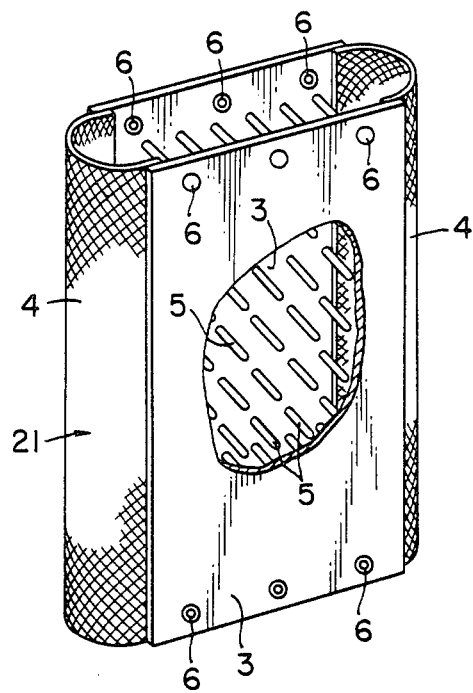
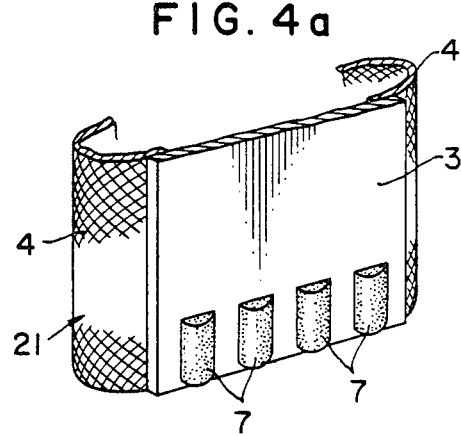
FIG. 4a
FIG. 4b
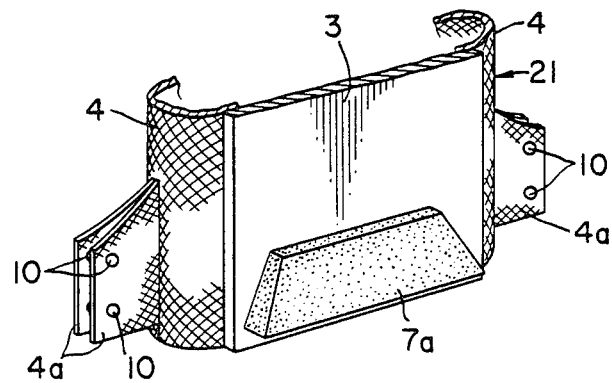

SPEED-SLOWING CONVEYING TOOL FOR FRUITS AND THE LIKE

BACKGROUND OF THE INVENTION

This invention relates to conveying devices for conveying fruits and vegetables (hereinafter referred to collectively as fruit(s)) which are apt to be damaged by shock or impact. More particularly, the invention relates to a speed-slowing conveying tool suitable for moving or lowering fruits at the time of their harvest from high positions to lower positions without damage to the fruits.

For harvesting or picking fruits from high places such as treetops, it has been the common practice heretofore for a picker to carry a container such as a basket or a sack, to pick and place the fruit in the container, and then, when a certain quantity of the fruit has been thus collected, to carry the fruit in the container to the ground. Thus, the picker has had to bear the load of carrying the container of increasing weight at the high place and also the load of carrying the container with the collected fruit to the ground. In the case of a picker harvesting from a standing position, he has been required to stoop or bend his knees to lay the fruit gently in a container on the ground so as not to damage the fruit. Such bodily actions have given rise to increased fatigue.

SUMMARY OF THE INVENTION

It is an object of this invention to provide a speed-slowing conveying tool for lowering fruit from a high place to a lower place without application of impact and without damage to the fruit.

Another object of this invention is to provide a conveying tool as stated above which operates automatically under only the force of gravity, thereby freeing the user of the tool of the task of bearing the weight of picked fruit and carrying the picked fruit from a high place to the ground or transportation means on the ground.

According to this invention, briefly summarized, there is provided a speed-slowing conveying tool for lowering fruit or the like from a high place to a lower place without damage thereto, said conveying tool comprising a hopper to be positioned at said high place and tubular conveying means connected at its upper end to the bottom of the hopper and extending downward toward said lower place, the conveying means comprising a pair of opposed and spaced-apart main sheets of rectangular planar shape with vertical edges and a pair of opposed side sheets of rectangular planar shape with vertical edges respectively secured to said vertical edges of the main sheets thereby to form a tubular structure, the main sheets possessing elasticity and flexibility and having on the inner surfaces thereof a large number of distributed elastic projecting members, the side sheets possessing flexibility and being more pliable than the main sheets, whereby the side sheets can respond more quickly to external forces and be deformed more readily thereby than the main sheets.

The nature, utility, and further features of this invention will be more clearly apparent from the following detailed description with respect to a preferred embodiment of the invention when read in conjunction with the accompanying drawings, briefly described below.

BRIEF DESCRIPTION OF THE DRAWINGS

In the accompanying drawings:

FIGS. 1a and 1b are respectively a front elevation and a side elevation showing one embodiment of this invention;

FIG. 1c is a diagrammatic vertical section taken along the plane indicated by line Ic-Ic in FIG. 1a;

FIG. 3 is a perspective view, with a part cut away, showing a unit section of the tool shown in FIG. 1;

FIGS. 4a and 4b are fragmentary perspective views respectively showing lower end parts of the tool shown in FIG. 1.

DETAILED DESCRIPTION OF THE INVENTION

Figure 1C:
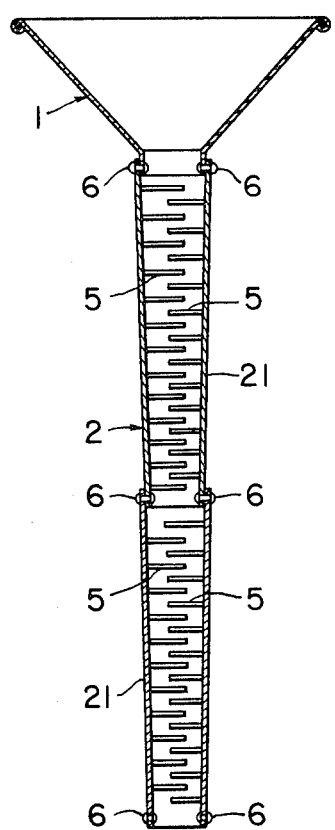

Referring first to FIGS. 1a, 1b, and 1c, the conveying tool of this invention comprises essentially a hopper 1 and a vertical conveying part 2 secured by fasteners 6 to the lower part of the hopper 1. The conveying part 2 is assembled from one or more conveying-part unit sections 21 all of similar construction and connected end-to-end by fasteners 6. While only two unit sections 21 are shown in FIG. 1, additional similar unit sections can be similarly connected if necessary. Thus, the vertical length of the conveying part 2 can be readily adjusted to suit the need. The fasteners 6 are all of detachable type such as hooks or loop-and-hook fastener sheets.

Figure 2A:
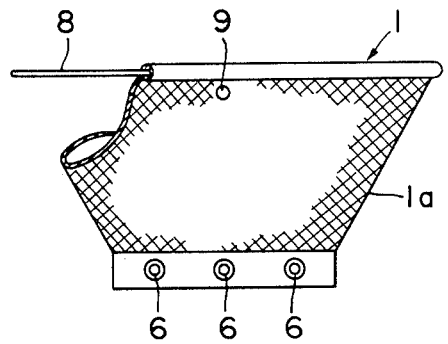
FIGS. 2a and 2b are respectively slightly enlarged front and side elevations showing the hopper of the tool shown in FIG. 1, a part of FIG. 2a being cut away.
Figure 2B:
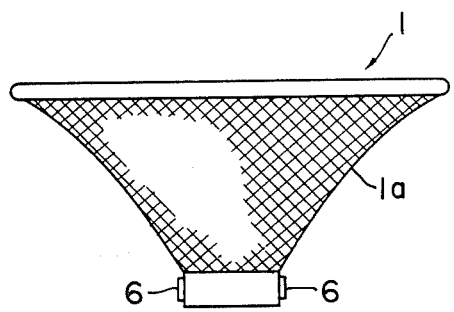

As shown in FIGS. 2a and 2b, the hopper 1 is of funnel shape resembling an inverted, somewhat deformed frustoconical shape having a circular upper rim and a constricted lower end of approximately elliptical cross section. The wall 1a of the hopper 1 is made of canvas, and its upper shape is maintained by a steel ring-shaped frame 8 fixed to and supporting its upper rim. The outer peripheral part of the lower end of the hopper 1 is provided with a suitable number of fastener members 6. Two holes 9 are formed in the upper part of the hopper wall 1a immediately below the frame 8 at diametrically opposite positions thereof. The hopper wall 1a may be made of only the canvas metioned above or some other fabric, or it may be compositely made of a fabric and an impact-absorbing material such as rubber or a synthetic resin.

An example of a unit section 21 of the conveying part 2 is shown in FIG. 3. This single unit section 21 itself may constitute the conveying part 2 in certain cases. In the example illustrated in FIG. 3, the unit section 21 comprises, essentially, two rectangular main sheets 3 in mutually opposed, spaced-apart disposition and two rectangular side sheets 4 disposed in mutually opposed state at respective vertical sides of the main sheets 3, the vertical or lateral edges of the main sheets 3 are joined to respective lateral edges of the side sheets 4 to form a tubular or duct-like structure.

Each main sheet 3 has a width (transverse or horizontal dimension) greater than that of a side sheet 4 and is adapted to have elasticity to react to deformation and flexibility or capability of readily being deflected in bending. Examples of materials suitable for use in fabricating the main sheet 3 are rubbers, ethylene-vinyl acetate copolymer resins, soft vinyl chloride resins, and urethane resins, used singly or in combination. These materials can be reinforced by laminating reinforcing cord therewith, such lamination ordinarily being of double ply. A greater number of plies of reinforcing cord tends to impair the flexibility of the sheet.

For the side sheet 4, a fibrous textile sheet such as a woven fabric or a nonwoven fabric or a pliable material similar to that of the main sheets 3 is used. When the same material is used for the main sheets and the side sheets, the side sheets are made more pliable than the main sheets by making the side sheets thinner.

A large number of projecting members 5 possessing elasticity are fixed at their root ends to the inner surfaces of the main sheets 3 at positions according to a specific distribution thereof. The projecting members 5 are in the shape of a pin. The main sheet 3 is fabricated from a material which will impart elasticity and flexibility to the sheet. The projecting members 5 need not be made of the same material as the main sheet as long as they possess elasticity. However, in the case where the projecting members 5 and the main sheet 3 are of the same material, the main sheet and the projecting member can be fabricated in one process step, for example, by integrally vulcanizing and molding a rubber sheet structure having a large number of projections on one face thereof. The shape of the projecting members 5 is a suitable shape such as a bar or a plate which, together with other particulars such as the density of the distributed projecting members 5 and their elasticity, are suitably selected according to factors such as the shapes and weights of the fruits.

The main sheets 3 are provided near their upper ends with fastener members 6 of the same number and corresponding positions as the fastener members 6 at the bottom of the hopper 1 for connection of the hopper and the conveying-part unit section 21.

When a picked fruit is dropped into the hopper 1, its falling speed is reduced as it passes through the conveying part 2, the degree of this speed reduction differing with the shape and weight of the fruit. For example, in the case of ama natsumikan (sweet citrus natsudaidai), a fruit picked from a young tree has a round shape resembling a sphere, but a fruit picked from a mature tree has a slightly more flattened shape. We have found that, as an effect of this difference in shape, the degree of the speed reduction of the latter fruit is lower than that of the former fruit, whereby the falling speed of the latter tends to be slightly higher. Accordingly, for the sake of positive functioning, it is preferable to provide other means for reducing the falling speed.

One example of such means comprises one or more weights attached to the bottom end part (i.e., the lower open end) of each main sheet 3 of the conveying part 2. In the case of a conveying part 2 comprising a plurality of unit sections 21 connected end-to-end to extend downward, the weight or weights are attached to the bottom end part of the lowest unit section 21. FIGS. 4a and 4b respectively show a plurality of relatively small weights 7 and a single weight 7a secured to the lower end of a convey-part unit section 21, the fasteners 6 at this lower end being removed. The weights 7 shown in FIG. 4a are of semicylindrical shape and are disposed in a horizontal row, while the weight shown in FIG. 4b is roughly of a plate shape extending across substantially the entire width of the main sheet 3.

When the bottom part of the conveying part 2 is forced to expand outward widely by the fruit descending therein, the outward expanding force is countered, by the inward force component of the force of gravity acting of the weight or weights. This inward force tends to close the bottom part of the conveying part 2 thereby to further reduce the falling speed of the fruit, even to a value close to zero. In the case where a plurality of small weights 7 as shown in FIG. 4a are used, the lower part of the conveying part 2 can undergo widely expanding deformation.

However, in the case where a single plate-like weight 7a is used, the main sheet 3 is restricted by this part, and the expansion deformation at the lower part of the conveying part 2 becomes small. Accordingly, as shown in FIG. 4b, portions of the skirt parts of the side sheets 4 of the unit section 21 are vertically slit thereby to enable the main sheets 3 to open widely. Each side sheet 4 is provided on opposite sides of its slit with flaps 4a attached thereto and extending horizontally outward. These flaps 4a are provided at their outer extremities with fasteners 10 which can be fastened together and closed for reducing the effect of the slit. Thus the lower opening of the conveying-part unit section 21 can be adjusted to suit the size of the fruit being passed therethrough. By closing the flaps 4a by means of the fasteners 10, the falling speed of fruit of small size can be reduced to a value approaching zero. That is, the conveying tool of this invention is useful for conveying fruits of a wide range of sizes.

In order to indicate more fully the detailed particulars and features of this invention, the following example of dimensions and other particulars of the conveying tool thereof are set forth, it being understood that it is presented as illustrative only and is not intended to limit the scope of the invention.

The hopper 1 of this example of the conveying tool has an upper rim part of a diameter of 350 mm, a lower part of a maximum diameter of 130 mm, a height of 200 mm, and six pairs of fasteners at its lower part. Each main sheet 3 of each conveying part unit section is made of a rubber sheet of a hardness of 60 (Japanese Industrial Standards K6301, JIS A), a thickness of 1 mm, a width of 165 mm, and a length of 400 mm. The inner surfaces of the main sheets 3 are provided with 120 projecting members 5, each of circular cross section of a diameter of 3 mm and a length of 30 mm, formed integrally with the main sheets and projecting perpendicularly therefrom with a uniform density. The side sheet measure 40 mm in width and 400 mm in length each and are formed from a woven fabric. Each of the upper and lower end parts of each conveying part unit section 21 is provided with 6 fastening devices.

Figure 5:
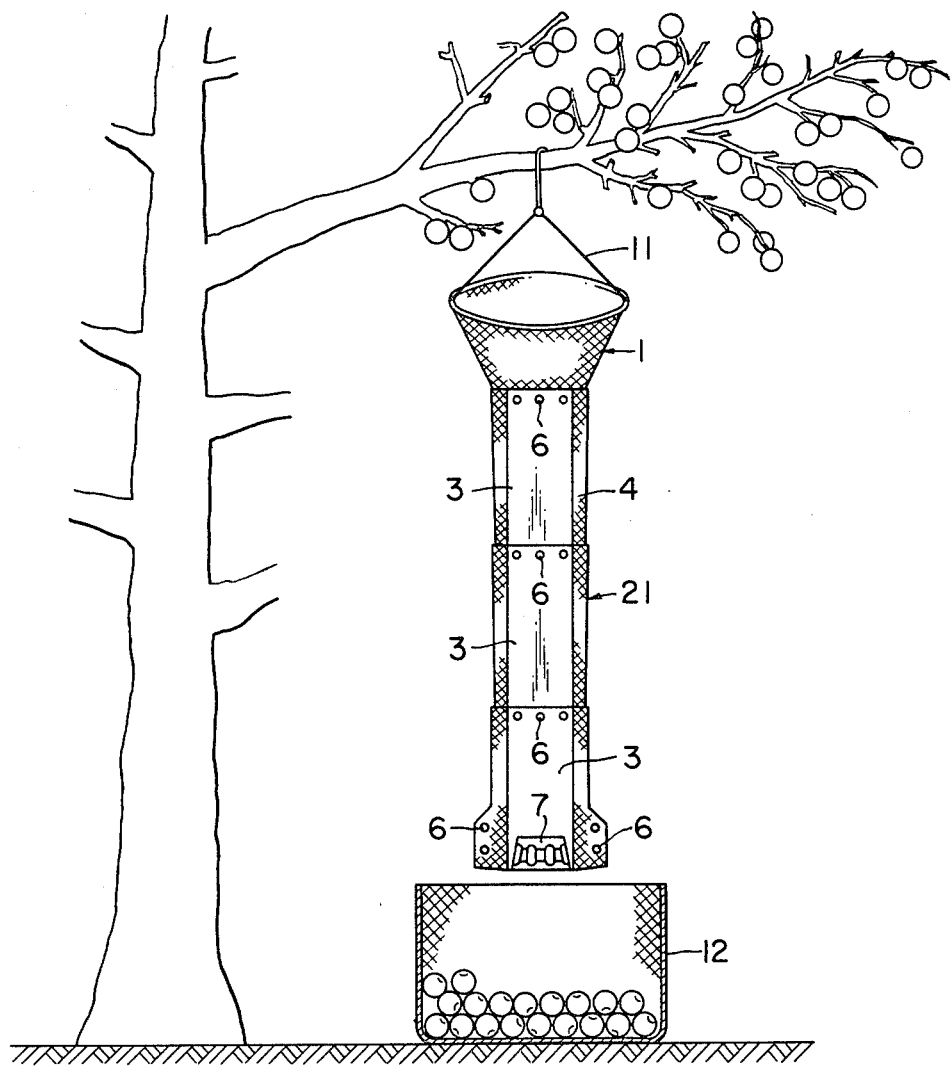
FIGS. 5 and 6 are diagrammatic elevations, in vertical section, respectively for description of different modes of use of the tool according to the invention.
Figure 6:
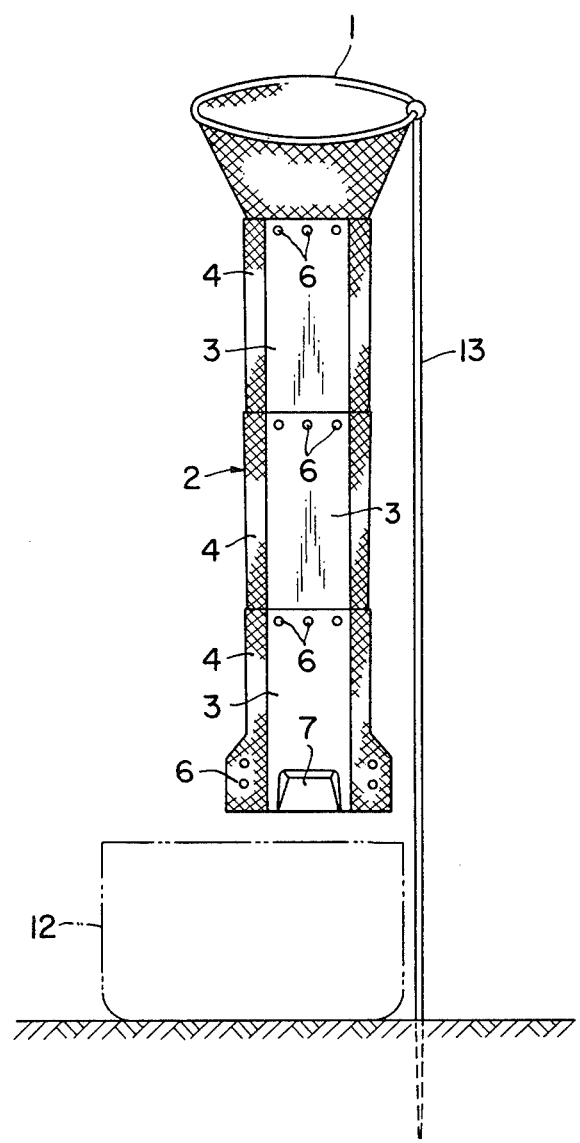

In one instance of actual use of the conveying tool of this invention, three conveying-part unit sections 21 were connected successively end-to-end and to the lower end of the hopper 1. The lower end portion of the lowermost unit section 21 was provided with plate-shaped weight 7a, and the lower skirt portions of the side sheets 4 were slit and provided with flaps 4a on each side as described hereinabove. The conveying tool thus assembled was suspended on a branch of approximately 2-meter height above the ground of an ama natsumikan by means of a cord 11 passed through the aforementioned holes 9 of the hopper 1 as shown in FIG. 5. A basket 12 was placed on the ground below this conveying tool.

Fruit was then picked from the tree and dropped into the hopper 1, whereupon the fruit was conveyed at reduced falling speed through the conveying part 2 and dropped gently into the basket 12. During the travel of the fruit through the conveying part 2 of the tool, its falling speed was reduced substantially to zero, whereby the impact to which the fruit was subjected was of the order of the impact in the case where the fruit was dropped from a height level corresponding to the lower open end of the conveying part 2 into the basket. The average diameter and height of the ama natsumikan were 110 mm and 70 mm, respectively, and the average weight was 400 grams.

In an instance of experimental use, a steel ring of a diameter slightly smaller than the frame 8 of the hopper 1 was fixed at one point thereof perpendicularly to the upper end of a support post 13. The greater part of the same conveying tool used in the above described example of use was passed through this ring except for the upper part of the hopper 1 which then rested on and was supported by the ring. The flaps 4a were kept closed by the fasteners 6. The support post 13 was then driven at its lower part vertically into the ground, whereby the conveying tool was suspended by the ring, which was approximately 2 meters above the ground. A basket was placed on the ground below the lower open end of the conveying tool.

When unshu-mikan (large mandarin oranges: Citrus unshu) were dropped into the hopper 1, they descended similar as in the case of the aforedescribed ama natsumikan as their falling speed was reduced to almost zero value. As a result, the impact to which these oranges were subjected was of the order of that in the case where they are dropped into the basket from the height of the lower open end of the conveying tool. The average diameter and height of these unshu-mikan were 65 mm and 50 mm, respectively, and their average weight was 120 grams.

Because of the construction of the conveying tool according to this invention as described above, in particular the flexible characteristic of the conveying part 2, the fruit descending therethrough tends to push apart the main sheets 3 thereof. This action is elastically countered by the inward force of the main sheets, which becomes a force resisting the descending movement of the fruit, whereby the falling speed of the fruit is braked. Furthermore, the elastic characteristic of the main sheets 3 functions to restore them to their original state, after passage of the fruit, in preparation for the passage of the succeeding fruit. Since the side sheets 4 connecting the main sheets 3 are flexible and are much more pliable than the main sheets, they enable the main sheets to be spread apart promptly to the required distance from the normal state in accordance with the sizes of the fruit and to return promptly from the spread open state to the original normal state after the passage of the fruit. Furthermore, because of their pliability, the side sheets 4 do not exert resistance to the force of the weights 7 tending to return the main sheets 3 inward toward each other.

As the fruit descends through the conveying part 2, they are softly supported by the elastic projecting members 5 as they undergo deflection and deformation. This action is accompanied by frictional resistance exerted by the projecting members 5 on the outer surface of the fruit, whereby the falling speed thereof is reduced. Because of the elastic nature of the projecting members 5, they cannot impart appreciable impact to the fruit and do not damage the outer surface of the fruit. After a fruit has deflected and then passed by a projecting member 5, the projecting member returns to its original normal state under its elastic restoring force.

Because of the flexible nature of the conveying part 2 of the conveying tool of this invention, it can be readily folded, and the hopper 1 also can be folded if it is made of a fabric. Accordingly, by using light flexible materials for the conveying tool, it can be made convenient for transportation, setting up for use, and storage when not in use. Another significant feature of the instant conveying tool is the design of the conveying part 2 wherein it is divided into a plurality of unit sections 21 of the same and interchangeable construction, which can be detachably connected successively end-to-end to any desired total length.

What we claim is:

1. A speed-slowing conveying tool for lowering fruit or the like from a high place to a lower place without damage thereto, said conveying tool comprising a hopper to be positioned at said high place and tubular conveying means connected at its upper end to the bottom of the hopper and extending downward toward said lower place, the conveying means comprising a pair of opposed and spaced-apart main sheets of rectangular planar shape with vertical edges and a pair of opposed side sheets of rectangular planar shape with vertical edges respectively secured to said vertical edges of the main sheets thereby to form a tubular structure, the main sheets possessing elasticity and flexibility and having on the inner surfaces thereof a large number of distributed elastic projecting members, the side sheets possessing flexibility and being more pliable than the main sheets.

2. A speed-slowing conveying tool according to claim 1, in which the hopper and the conveying means are detachably connected, and the conveying means comprises a plurality of conveying-part unit sections detachably connected end-to-end.

3. A speed-slowing conveying tool according to claim 1, further comprising weight means attached to the lower end parts of the main sheets of the conveying means on the outer parts thereof in a manner to resist expansion of the lower opening of the conveying means.

4. A speed-slowing conveying tool according to claim 4, in which the weight means comprises a number of weights disposed in a horizontal row.

5. A speed-slowing conveying tool according to claim 4, in which the weight means is of a plate shape.

6. A speed-slowing conveying tool according to claim 1, in which each of the side sheets is formed with a vertical slit in the skirt part thereof, and flaps are attached to the side sheet on opposite sides of the slit and detachably fastened together.

7. A speed-slowing conveying tool according to claim 1, in which the projecting members are in the shape of a pin.

* * * * *